US009241600B2

(12) United States Patent
Pelfrey

(10) Patent No.: US 9,241,600 B2
(45) Date of Patent: Jan. 26, 2016

(54) ADJUSTABLE SOLAR-POWER UNIT FOR A DISPENSER

(75) Inventor: Keith Allen Pelfrey, Wadsworth, OH (US)

(73) Assignee: GOJO Industries, Inc., Akron, OH (US)

( * ) Notice: Subject to any disclaimer, the term of this patent is extended or adjusted under 35 U.S.C. 154(b) by 506 days.

(21) Appl. No.: 12/416,416

(22) Filed: Apr. 1, 2009

(65) Prior Publication Data
US 2010/0252569 A1 Oct. 7, 2010

(51) Int. Cl.
*A47K 5/12* (2006.01)
*F24J 2/54* (2006.01)

(52) U.S. Cl.
CPC . *A47K 5/12* (2013.01); *F24J 2/541* (2013.01); *Y02E 10/46* (2013.01); *Y02E 10/47* (2013.01)

(58) Field of Classification Search
CPC .......... Y02E 10/47; Y02E 10/46; A47K 5/12; F24J 2/541
USPC ......... 136/243–246, 248, 251, 252, 259, 292; 222/181.3, 333
See application file for complete search history.

(56) References Cited

U.S. PATENT DOCUMENTS

| | | | |
|---|---|---|---|
| 2,400,776 A * | 5/1946 | Nordeen et al. | 225/74 |
| 4,773,944 A * | 9/1988 | Nath et al. | 136/249 |
| 5,772,291 A | 6/1998 | Byrd | |
| 6,105,898 A | 8/2000 | Byrd | |
| 6,201,181 B1 * | 3/2001 | Azzam et al. | 136/244 |
| 6,209,752 B1 * | 4/2001 | Mitchell et al. | 222/63 |
| 6,263,674 B1 | 7/2001 | Fileman | |
| 6,293,486 B1 | 9/2001 | Byrd | |
| 6,695,246 B1 | 2/2004 | Elliott | |
| 6,854,684 B2 | 2/2005 | Byrd | |
| 6,870,087 B1 | 3/2005 | Gallagher | |
| 7,182,222 B2 | 2/2007 | Prabucki | |
| 7,240,674 B2 | 7/2007 | Patterson | |
| 7,325,767 B2 | 2/2008 | Elliott | |
| 7,325,768 B2 | 2/2008 | Byrd | |

(Continued)

FOREIGN PATENT DOCUMENTS

| | | |
|---|---|---|
| CN | 1781424 A | 6/2006 |
| CN | 101375111 A | 2/2009 |

(Continued)

OTHER PUBLICATIONS

EPO, Partial European Search Report dated Jul. 16, 2013, conducted in Application No. EP 10 15 8441, European counterpart to subject U.S. Appl. No. 12/416,416.
Taiwan Patent Office, "Taiwan IPO Search Report" in counterpart Taiwanese Patent Application No. 099109931 dated Aug. 5, 2014.

*Primary Examiner* — Jason Boeckmann
(74) *Attorney, Agent, or Firm* — Renner, Kenner, Greive, Bobak, Taylor & Weber

(57) ABSTRACT

An adjustable solar-power unit to power a dispenser includes a support housing maintaining a receiving aperture to rotatably retain a solar panel carrying holder therein. The adjustable solar-power unit is configured to be mounted remotely from the dispenser or may be configured to be integral with a housing that maintains the components of the dispenser. The holder may be rotated or pivoted so that the angle of incidence of the ambient light can be substantially perpendicular with that of the solar elements carried by the holder to generate an optimal amount of electrical power therefrom in order to power the dispenser.

16 Claims, 8 Drawing Sheets

(56) References Cited

U.S. PATENT DOCUMENTS

| | | |
|---|---|---|
| 7,354,015 B2 | 4/2008 | Byrd |
| 2006/0090789 A1* | 5/2006 | Thompson .................... 136/246 |
| 2007/0193620 A1* | 8/2007 | Hines et al. ................... 136/246 |
| 2008/0109956 A1 | 5/2008 | Bayley et al. |
| 2009/0026305 A1 | 1/2009 | Elliott et al. |

FOREIGN PATENT DOCUMENTS

| | | |
|---|---|---|
| DE | 101 03 890 A1 | 8/2002 |
| JP | 52-159104 U | 12/1977 |
| WO | 02/49490 | 6/2002 |
| WO | 2008/124642 | 10/2008 |

\* cited by examiner

ADJUSTABLE SOLAR-POWER UNIT FOR A DISPENSER

TECHNICAL FIELD

Generally, the present invention relates to dispensers for dispensing material. In particular, the present invention is directed to solar-powered dispensers. More particularly, the present invention is directed to an adjustable solar-power unit for a dispenser in which the angle of the solar elements may be adjusted to enhance the capture of solar energy.

BACKGROUND ART

Touch-free and other automatic dispensers require electrical power in order to dispense material from a refill container. For example, in the case of touch-free soap dispensers, soap is automatically dispensed upon the detection of a user's hand via an IR (infrared) sensor. While some dispensers may utilize a wired power source, such as a wall outlet, this restricts the location at which the dispenser may be mounted to those areas where such outlets are available. To overcome this, many touch-free or automatic dispensers utilize a portable power source, such as a battery, thereby allowing the dispenser to be mounted in any desired location.

Batteries, however, require frequent replacement, which is costly, and as such, dispensers that utilize solar power would be beneficial. Furthermore, there is a need for an adjustable solar-power unit that is configured to be integral with a dispenser. Additionally, there is a need for an adjustable solar-power unit that may be mounted in a remote location separate from a dispenser. Still yet, there is a need for an adjustable solar-power unit that is manufactured as a flat section and then folded via living hinges, so as to reduce manufacturing costs. In addition, there is a need for an adjustable solar-power unit having a holder to adjust the position of a solar element with respect to ambient light.

SUMMARY OF INVENTION

An adjustable solar-power unit to power a dispenser comprising a support housing having a pair of opposed retainers; a holder maintaining a pair of opposed pivots extending therefrom that are rotatably retained by said retainers; and at least one solar element carried by said holder and adapted to be electrically coupled to the dispenser, wherein said holder is rotatably moved to adjust the angle of said at least one solar element with respect to incoming ambient light received thereby, in order to generate power for the dispenser.

A dispenser for dispensing material comprising a housing maintaining a pair of opposed retainers; a holder having a pair of opposed pivots extending therefrom that are rotatably retained by said retainers; at least one solar element carried by said holder; a dispenser controller electrically coupled to said solar element; a pump coupled to said dispenser controller, said pump adapted to dispense said material from said dispenser; and an actuator coupled to said dispenser controller, wherein said solar element is rotatably adjusted to position said solar element to adjust the amount of ambient light received thereby to power said dispenser controller, such that said pump dispenses material from the dispenser when said actuator is engaged.

BRIEF DESCRIPTION OF THE DRAWINGS

These and other features and advantages of the present invention will become better understood with regard to the following description, appended claims, and accompanying drawings wherein:

BEST MODE FOR CARRYING OUT THE INVENTION

Solar-powered dispensers are configured with various solar panels or solar cells that are affixed to the dispenser housing to capture and convert the solar energy from the ambient light that is incident thereon into electrical power. The converted electrical power is then used to directly power the dispenser or to charge a rechargeable battery or capacitor maintained within the dispenser housing. However, the angle in which light is incident upon the surface of the solar panel or solar cells directly affects the amount of electrical power that is converted by the solar panels.

For example, in certain scenarios, dispensers may be configured with various solar panels and solar cells positioned in a predetermined and standard position in relation to the ambient light source and may provide sufficient power for full or supplemental power to the dispenser. However, due to many factors, including but not limited to the reduced size and surface area provided for placement of solar panels on many dispensers, the often low levels of ambient light from sunlight and/or artificial light within a room, and the placement of dispensers on or near walls or near other shadow-causing objects, the placement of the solar panels at a predetermined angle in relation to the ambient light source may not be sufficient to generate adequate energy. That is, due to the various locations in which a dispenser may be mounted, the angle in which ambient light is incident upon the solar panel or solar cells is often not optimal for the efficient generation of electrical power. As such, it is foreseen that many solar-powered dispensers generate an insufficient amount of electrical power in which to adequately power the dispenser, thus leading to unsatisfactory dispenser performance. Thus, therefore there is a need to provide a solar unit for a dispenser, whereby a rotating solar unit allows for the adjustment of the angle between the solar panel or solar cell and the light incident thereon that is provided by an ambient light source within the area in which the dispenser is placed.

Figure 1:
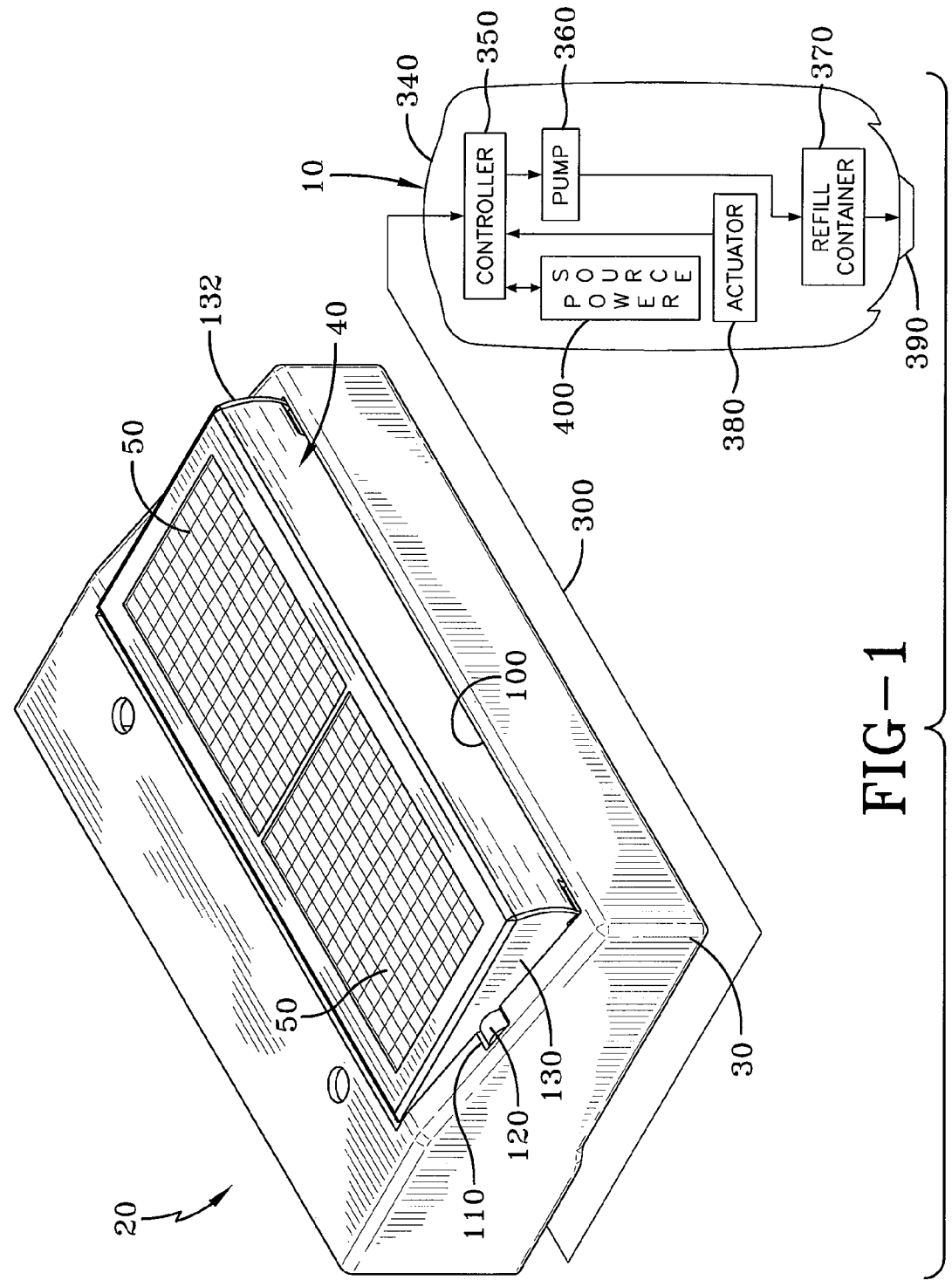
FIG. 1 is a perspective view of a dispenser remotely coupled to a support housing provided by an adjustable solar-power unit in accordance with the concepts of the present invention.
Figure 2:
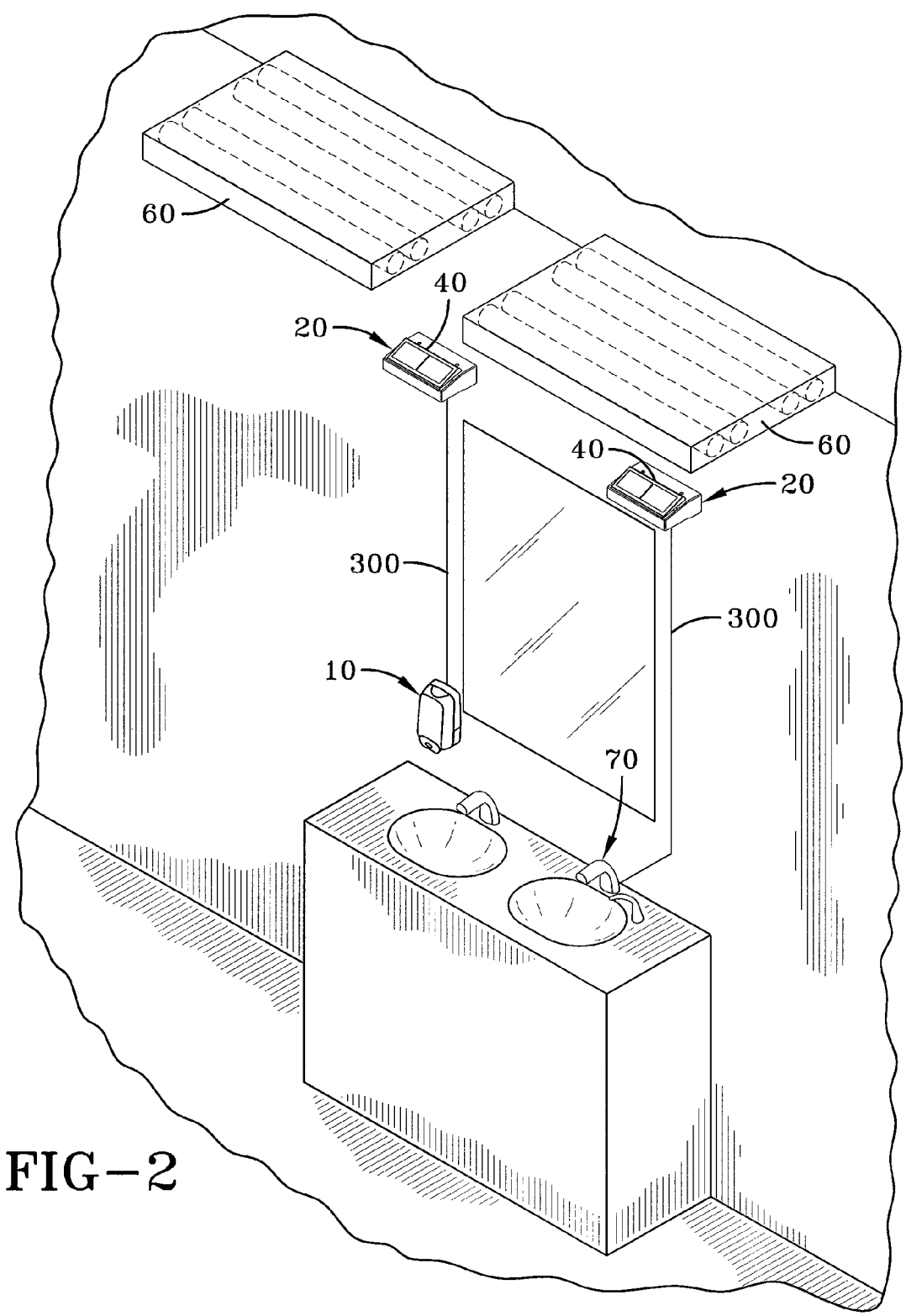
FIG. 2 is a perspective view of an adjustable solar-power unit remotely coupled to a dispenser and to a fixture in accordance with the concepts of the present invention.

An adjustable solar-power unit to energize a dispenser 10 is generally referred to by the numeral 20, as shown in FIG. 1 of the drawings. The adjustable solar-power unit 20, as shown in FIG. 1, maintains a support housing 30 that rotatably retains a holder 40 that includes one or more solar elements 50. For the purposes of the following discussion, the term "solar element" is defined as any solar panel, solar cell, photovoltaic device, or portion thereof that is capable of converting solar energy into electrical power. The solar elements 50 are electrically coupled to the dispenser 10 to provide operational power thereto. The rotatable holder 40 allows the one or more solar elements 50 to be positioned so that they are optimally oriented to capture the maximum amount of incoming ambient light. For example, by rotating the holder 40 to a position whereby the solar elements 50 are oriented perpendicular to incident ambient light, the solar elements 50 are allowed to operate at their highest level of power output, which allows the dispenser 10 that is coupled thereto to be optimally powered. As such, the adjustable solar-power unit 20 may be mounted at any desired location that is in the proximity of a light source 60, as shown in FIG. 2, to thereby remotely power the dispenser 10, as well as any other fixture 70, including but not limited to: automatic faucets; automatic toilets; dispensers of viscous material, such as soap, sanitizer, and lotion; towel dispensers; tablet dispensers; wipe dispensers; personal-hygiene object dispensers; automatic-flush toilet systems; automatic faucets; and automatic air-deodorant spray systems.

Figure 3:
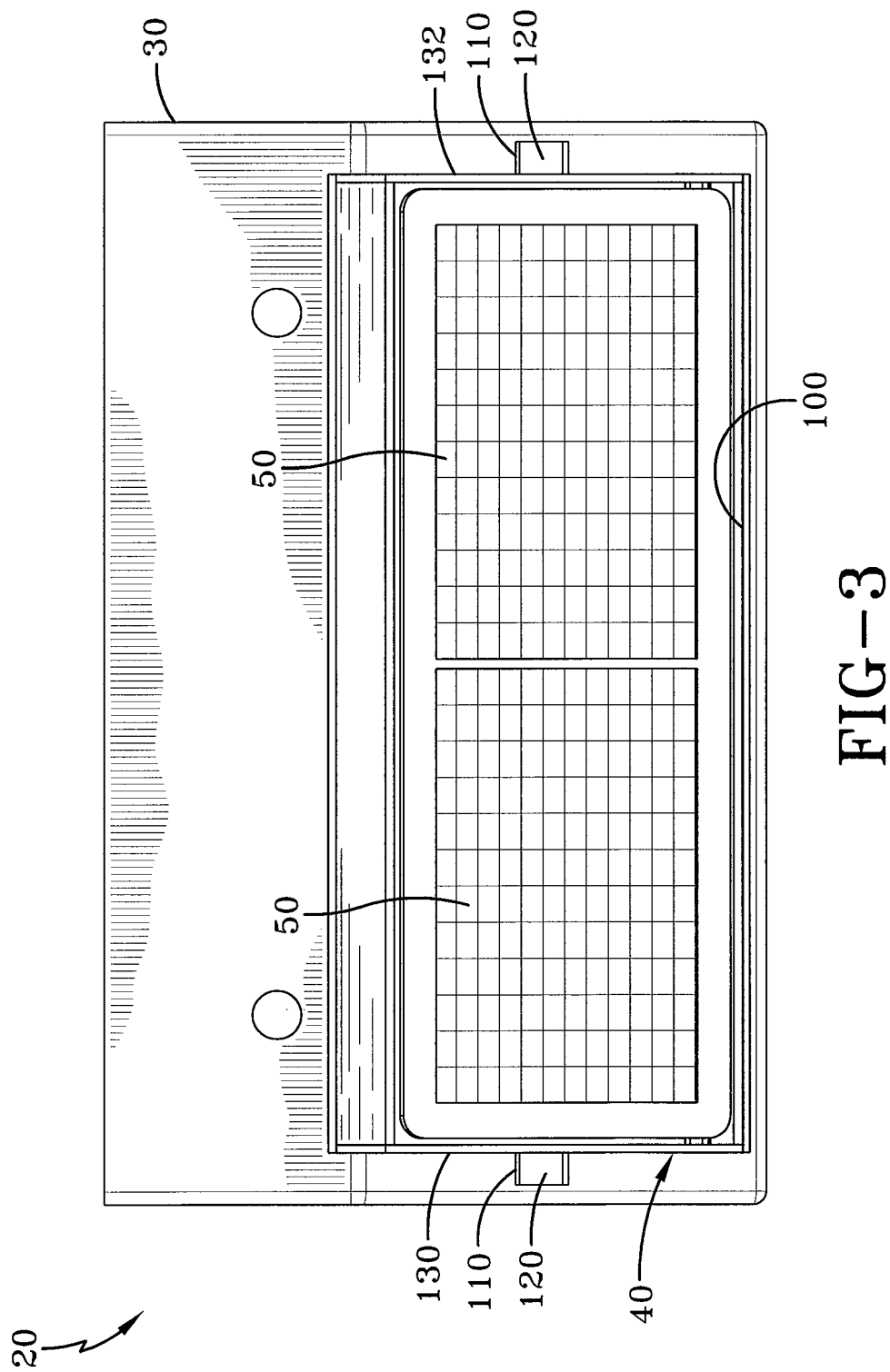
FIG. 3 is a top plan view of the adjustable solar-power unit in accordance with the concepts of the present invention.

Continuing to FIG. 3, the support housing 30 of the adjustable solar-panel unit 20 includes a receiving aperture 100 that is sized and dimensioned to receive the holder 40 therein. In addition, the support housing 30 also maintains a pair of opposed retainers 110 that receive and pivotably retain corresponding cylindrical pivots 120 that extend from each end 130 and 132 of the holder 40, thus allowing the holder 40 to be rotated to any desired position. It should be appreciated that the support housing 30 may be formed from any suitable material, such as plastic or metal.

Figure 4:
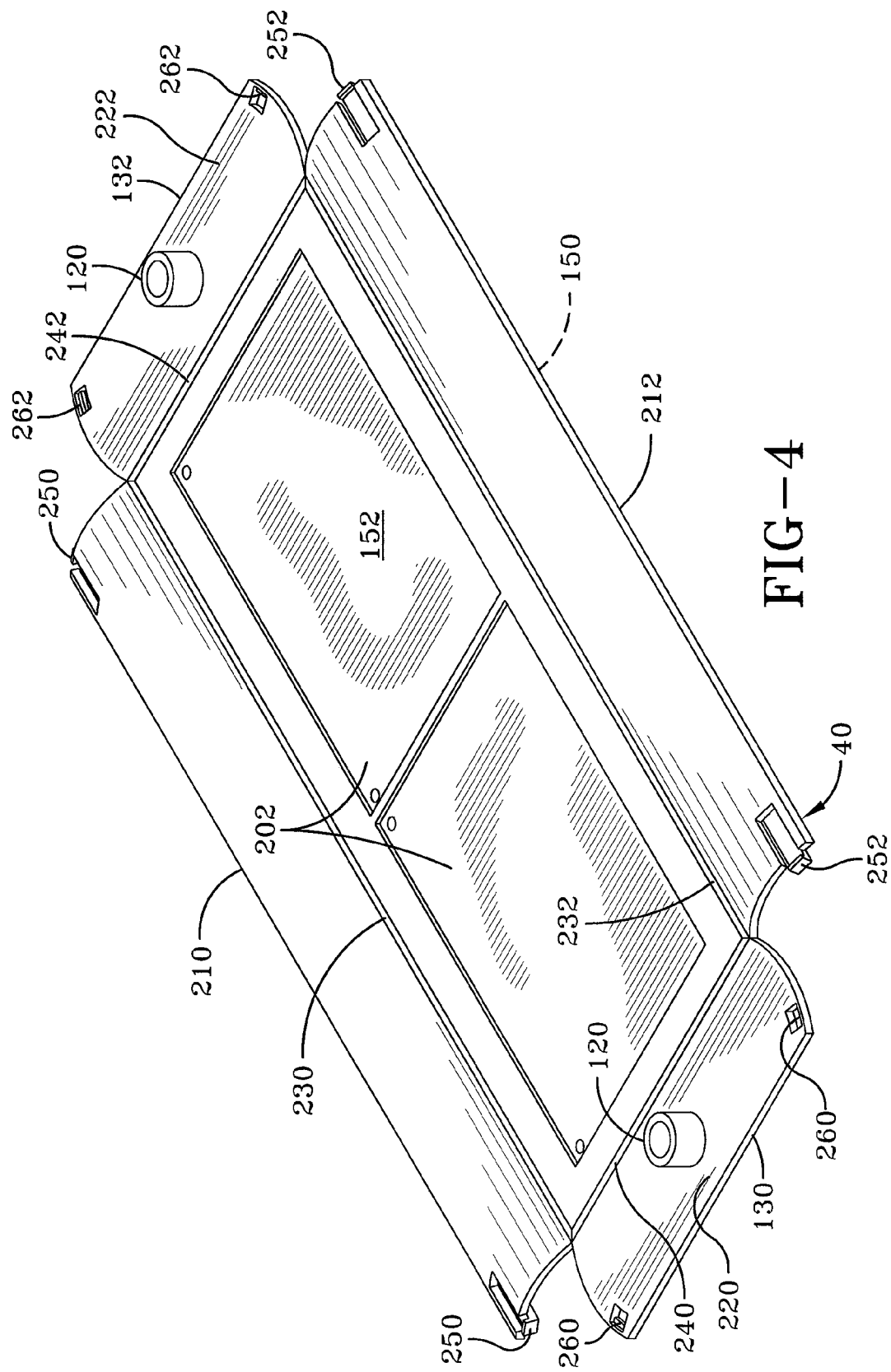
FIG. 4 is a perspective view of the exterior surface of a holder maintained by the adjustable solar-power unit in accordance with the concepts of the present invention.
Figure 5:
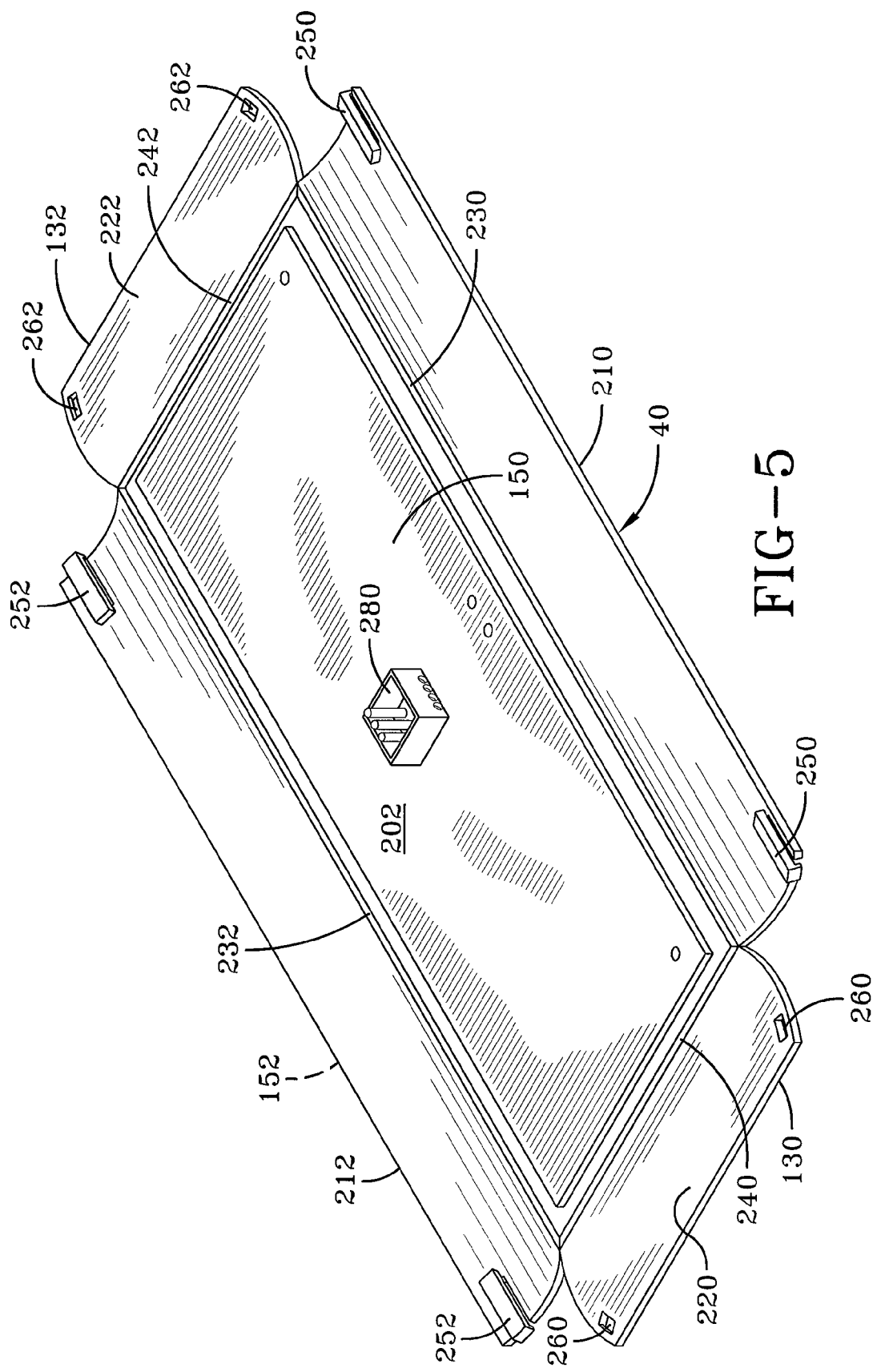
FIG. 5 is a perspective view of the interior surface of the holder carried by the support housing in accordance with the concepts of the present invention.
Figure 6:
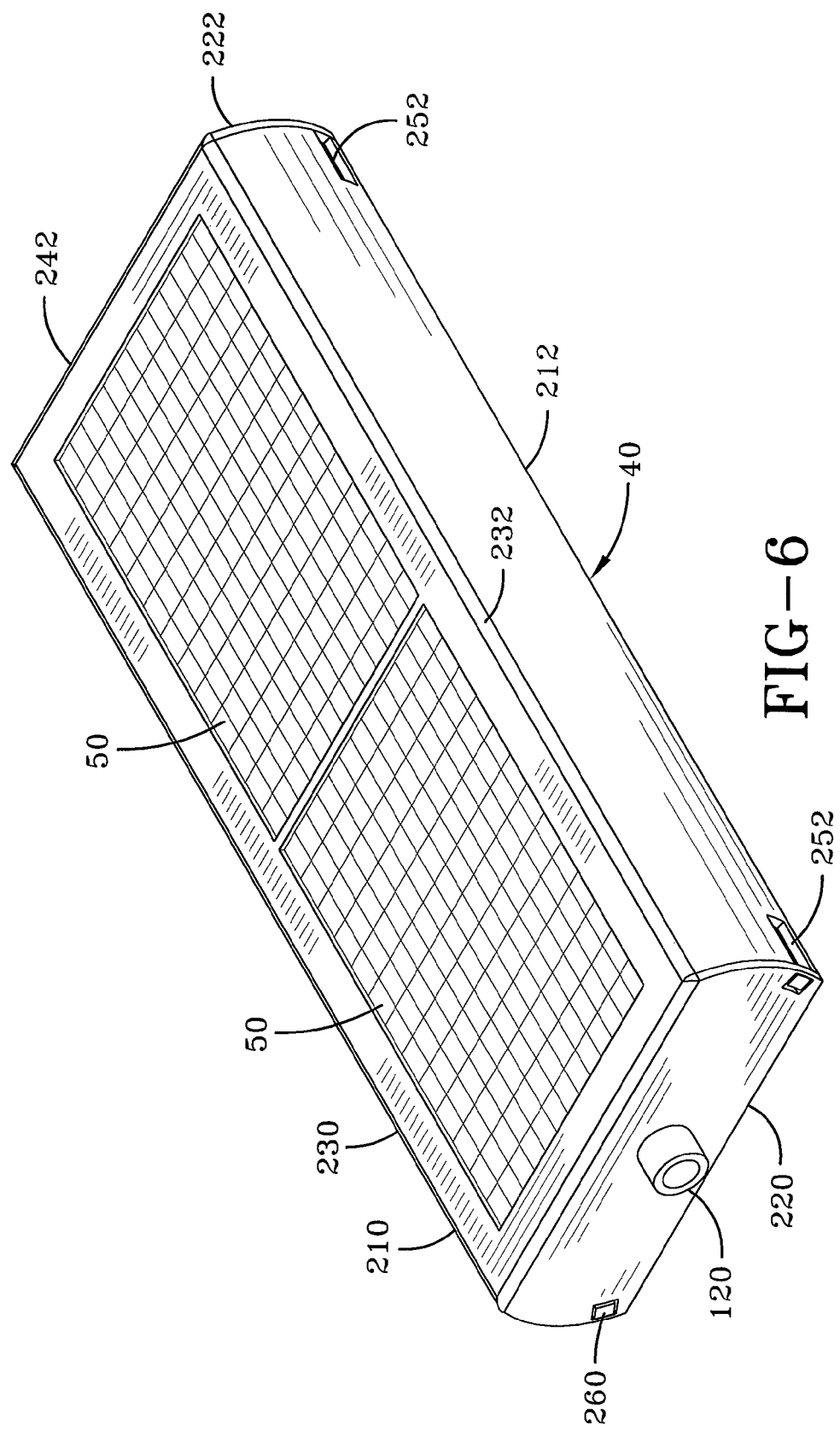
FIG. 6 is a top perspective view of the assembled holder in accordance with the concepts of the present invention.
Figure 7:
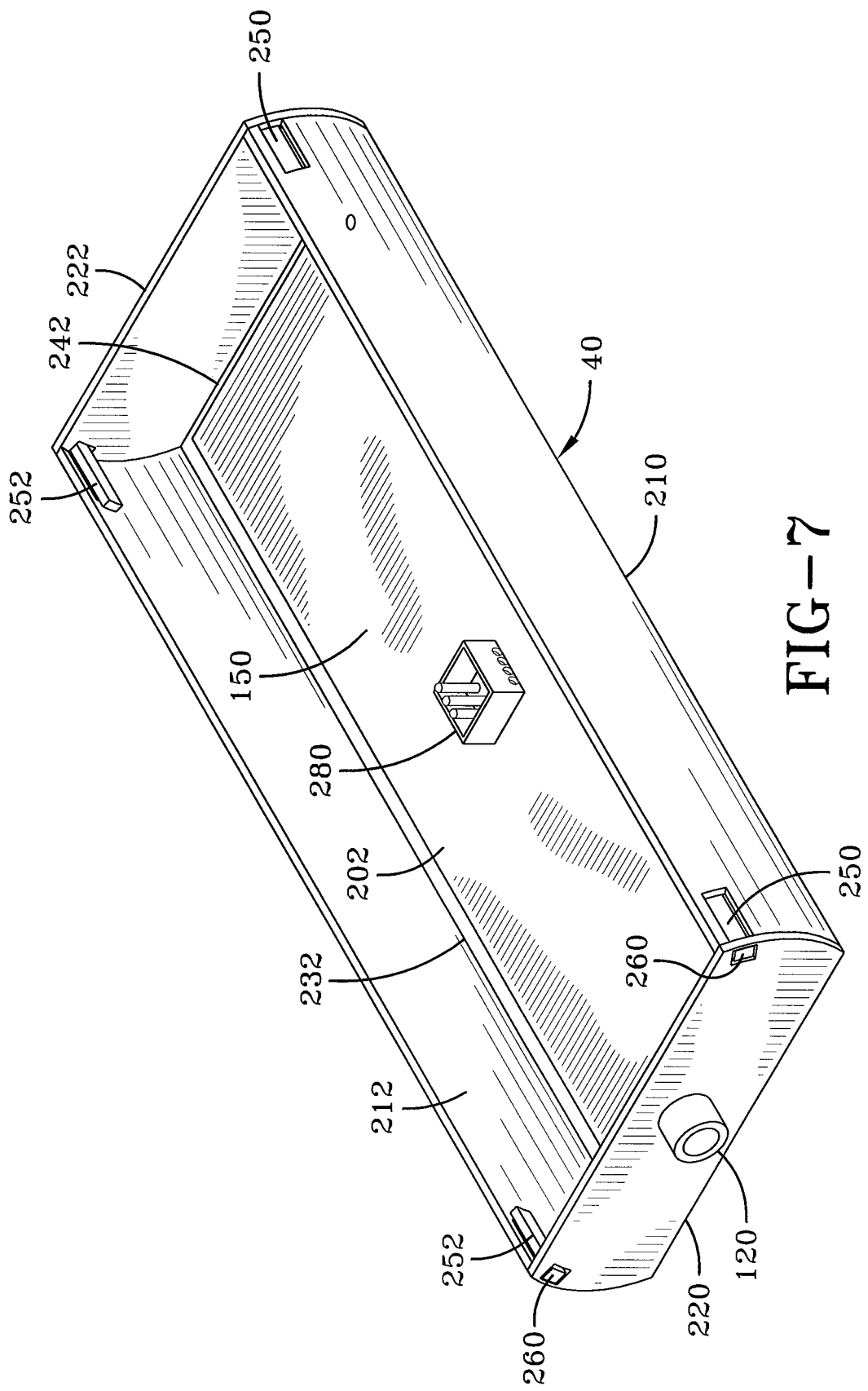
FIG. 7 is a bottom perspective view of the assembled holder in accordance with the concepts of the present invention.

As shown in FIGS. 4-5, the holder 40 is configured so that it can be manufactured as a substantially flat section, having an interior surface 150 and an exterior surface 152, that is folded in a manner to form the operative holder 40 that is able to pivot or rotate within the support housing 30. As such, the holder 40 comprises a central section 202 that is surrounded by opposed lateral support sections 210 and 212 and opposed pivot sections 220 and 222, which maintain one of the pivots 120. In one aspect, the holder 40 may comprise a unitary section of material, such as plastic or aluminum. Thus, folding the lateral support sections 210,212 and the pivot sections 220,222 with respect to the central section 202 results in a plurality of foldable living hinges being formed at the interface between the central section 202 and each of the lateral support sections 210,212 and pivot sections 220,222. Specifically, living hinges 230,232 are respectively formed at the interface between the central section 202 and the lateral support sections 210,212, while living hinges 240,242 are respectively formed at the interface between the central section 202 and the pivot sections 220,222. The living hinges 230,232,240,242 allow the holder 40 to be formed from a flat section of material, such as plastic, and then later configured as the finished operative holder 40, shown in FIGS. 6 and 7. As such, the lateral support sections 210,212 and the pivot sections 220,222 fold about respective living hinges 230,232 and 240,242 so that they are oriented at a substantially right angle to that of the central section 202 once folded. It should be appreciated that the lateral support sections 210,212 may be configured to have an arcuate or curved profile to facilitate their rotating movement within the receiving aperture 100 of the support housing 30.

In order to maintain the orientation of the lateral support sections 210,212 and the pivot sections 220,222 with respect to the central section 202 when folded, the lateral support sections 210,212 include respective pairs of locking tabs 250 and 252 at each of their ends 254,256, while the pivot sections 220,222 include a pair of attachment apertures 260,262 at each of their ends 264,266. As such, when the sections 210, 212,220,222 of the holder 40 are folded so as to be at a substantially right angle to the central section 202, the attachment apertures 260,262 receive locking tabs 250,252, respectively, which co-act to retain the sections 210,212,220,222 at a substantially right angle to the central section 202. Alternatively, the lateral support sections 210,212 and the pivot sections 220,222 may be retained to one another via any other suitable means, including adhesive, rivets, screws, or the like.

Continuing, the solar elements 50 are attached to the exterior surface 152 of the central section 202 using any suitable means of fixation, such as adhesive for example. Disposed upon the interior surface 150 of the central section 202 of the holder 40 is a power connector 280 that electrically couples the dispenser 10 to the solar elements 50 via a removable power line 300. While the power line 300 may be removably attached to the power connector 280, it is also contemplated that the power line 300 may be directly coupled to the solar elements 50, thereby foregoing the need of the power connector 280. As such, the power line 300 supplies power to the dispenser 10 to enable its operation of dispensing various material or items therefrom in a manner to be discussed.

Returning to FIG. 1, the dispenser 10 includes a housing 340, which may be comprised of any suitable material, such as plastic or metal for example. The housing 340 carries a controller 350, which comprises the necessary hardware and/or software needed to carry out the functions to be discussed. Coupled to the controller 350 is a pump 360 that is in operative communication with a replaceable refill container 370, which maintains any suitable material or item to be dispensed, such as soap. An actuator 380 coupled to the controller 150 initiates a dispensing cycle of an amount of material from a nozzle 390. The actuator 380 may comprise a manually-actuated button, lever, or other device that when physically engaged, prompts the controller 350 to actuate the pump 360, so as to dispense material from the refill container 370. Alternatively, the dispenser 100 may be configured to enable touch-free operation, such that the actuator 380 is configured as a proximity sensor, such as an IR (infrared) sensor, whereupon the presence of the user's hand initiates the dispensement of material from the refill container 370. Thus, to energize the controller 350 and the other components of the dispenser 10 to enable its operation, power generated by the solar elements 50 is delivered to the controller 350 via the power line 300, where the power is formatted in a manner compatible for the operation of the dispenser 10.

Thus, the adjustable solar-power unit 20 may be placed in a region that receives solar energy but is remotely located from the dispenser 10, which is beneficial, as it allows power to be supplied to one or more dispensers 10 that may not be placed in regions with adequate ambient light to enable the operation of the solar elements 50.

Figure 8:
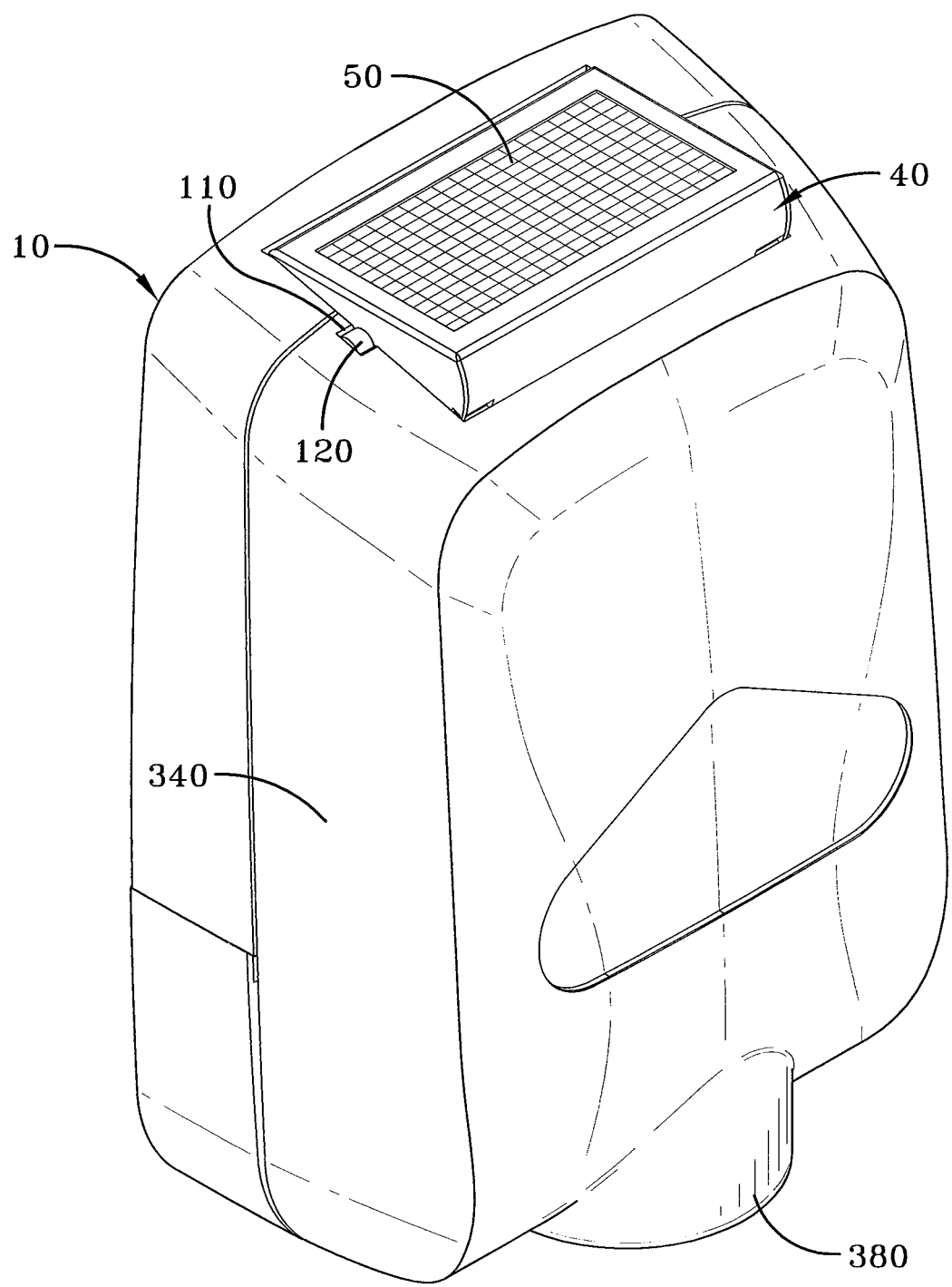
FIG. 8 is a perspective view of the holder when made integral with a dispenser housing in accordance with the concepts of the present invention.

In another embodiment, the holder 40 of the adjustable solar-power unit 20 may be made integral with the housing 340 that maintains the components of the dispenser 10, such as a manually-operated dispenser or a touch-free dispenser, as shown in FIG. 8. Such a configuration is beneficial when the dispenser 10 is mounted in a region having a suitable amount of ambient light that allows the solar elements 50 to generate sufficient power therefrom to operate the dispenser 10. Furthermore, the holder 40 may be made with any other fixture, as previously discussed, where such a configuration is desirable.

It should be appreciated that the dispenser 10 may be configured so that it is directly powered by the power generated by the solar panels 50. Or the dispenser 10 may include a rechargeable power source 400, such as a rechargeable battery or capacitor (not shown), which is recharged by the power supplied by the solar panels 50, thus allowing uninterrupted operation of the dispenser 10 when ambient lighting is available or not available.

It will, therefore, be appreciated that one advantage of one or more embodiments of the present invention is that an adjustable solar-power unit provides an adjustable holder that can be positioned to allow the solar elements carried thereby to be positioned to enhance that amount of electrical power generated therefrom to power a dispenser. Another advantage of the present invention is that the adjustable solar-power unit may be located remotely from the dispenser. Yet another advantage of the present invention is that the adjustable solar-power unit may form a housing in which the components of the dispenser are maintained. Still another advantage of the present invention is that the holder may be formed as a plurality of flat sections that are rotated via living hinges to form the holder.

Although the present invention has been described in considerable detail with reference to certain embodiments, other embodiments are possible. Therefore, the spirit and scope of the appended claims should not be limited to the description of the embodiments contained herein.

What is claimed is:

1. An adjustable solar-power unit to power a dispenser comprising:
   a support housing having a receiving aperture, such that a pair of opposed retainers are disposed in a wall of said support housing adjacent to said receiving aperture, such that each said retainer includes a slot disposed in said wall, each said slot extending within said wall and terminating at one end at an opening created by each said slot in a surface of said support housing other than said wall;
   a holder having a central section including a pair of opposed pivots extending therefrom, such that one said pivot is rotatably carried in each said slot and a portion of said pivots extend out of said openings above said surface of said support housing; and
   at least one solar element attached to said central section and adapted to be electrically coupled to the dispenser;
   wherein said central section is moved by rotating at least one of said pivots to adjust the angle of said at least one solar element with respect to incoming ambient light received thereby.

2. The adjustable solar-power unit of claim 1, wherein said holder includes opposed pivot sections from which one said pivot extends.

3. The adjustable solar-power unit of claim 1, wherein said holder includes opposed arcuate sections.

4. The adjustable solar-power unit of claim 1, wherein at least one solar element is electrically coupled to a power connector maintained by said holder, said power connector adapted to be removably coupled to the dispenser.

5. The dispenser of claim 1, wherein said pivots are in axial alignment with a longitudinal axis of said central section.

6. The adjustable solar power unit of claim 1, wherein each said surface extends at an angle from a first edge of said receiving aperture to a second edge of said receiving aperture, such that each said opening is positioned below one of said edges.

7. A dispenser for dispensing material comprising:
   a housing having a receiving aperture, such that a pair of opposed retainers are disposed in a wall of said housing adjacent to said receiving aperture, said retainers each having an opening disposed in a surface of said housing, such that each said retainer includes a slot disposed in said wall, each said slot extending within said wall and terminating at one end at an opening created by each said slot in a surface of said support housing other than said wall;
   a holder having a central section including a pair of opposed pivots extending therefrom, such that one said pivot is rotatably carried in each said slot and a portion of said pivots extend out of said openings above said surface of said support housing;
   at least one solar element attached to said central section;
   a dispenser controller electrically coupled to said solar element;
   a pump coupled to said dispenser controller, said pump adapted to dispense said material from said dispenser; and
   an actuator coupled to said dispenser controller;
   wherein said central section is moved by rotating at least one of said pivots to adjust the amount of ambient light received by said solar element so as to power said dispenser controller, such that said pump dispenses material from the dispenser when said actuator is engaged.

8. The dispenser of claim 7, wherein said holder includes opposed pivot sections from which one said pivot extends.

9. The dispenser of claim 7, wherein said holder includes opposed arcuate sections.

10. The dispenser of claim 7, wherein said at least one solar element is electrically coupled to a power connector maintained by said holder, said power connector adapted to be removably coupled to said dispenser controller.

11. The dispenser of claim 7, further comprising a rechargeable power source coupled to said dispenser controller, wherein said power generated by said at least one solar element charges said rechargeable power source.

12. The dispenser of claim 11, wherein said rechargeable power source comprises a battery.

13. The dispenser of claim 11, wherein said rechargeable power source comprises a capacitor.

14. The dispenser of claim 7, wherein said actuator comprises a proximity sensor.

15. The dispenser of claim 7, wherein said pivots are in axial alignment with a longitudinal axis of said central section.

16. The dispenser of claim 7, wherein each said surface extends at an angle from a first edge of said receiving aperture to a second edge of said receiving aperture, such that each said opening is positioned below one of said edges.

* * * * *